UNITED STATES PATENT OFFICE.

PHILIP INCH, OF THE UNITED STATES NAVY.

PAINT.

SPECIFICATION forming part of Letters Patent No. 546,888, dated September 24, 1895.

Application filed April 30, 1895. Serial No. 547,612. (No specimens.)

*To all whom it may concern:*

Be it known that I, PHILIP INCH, of the United States Navy, a citizen of the United States, residing at Washington, in the District of Columbia, have invented certain new and useful Improvements in Paints, of which the following is a specification.

My invention is a metallic paint; and it consists of a composition and method of making the same, adapted to be used as a pigment and to resist the action of water and the atmosphere, being practically non-corrosive.

The pigment is intended for use for the painting of all exposed surfaces, and may be applied to surfaces of wood or metal with an effect equally as good, and in both instances it not only resists all corrosive action, but forms a close union with the surface to which it is applied and has no tendency to scale or to separate from such surfaces.

In the manufacture of the pigment I take two parts of tin and one part of zinc, and I first clean the metal by the use of sal-ammoniac in the proportion of about one ounce to one hundred pounds of the metal. The tin and zinc are subjected to the action of the sal-ammoniac while in a melted condition, and after the metals have been thoroughly stirred to unite them the mass is cooled down to a semifluid condition, after which it is poured into a sieve, or a canvas bag acting as a sieve. This action granulates the semifluid mass, and this granulation may be continued through other sieves until it has reached the proper degree of fineness. The granulated product is then mixed with oil and a suitable drier with any suitable coloring-matter, and is then ready for use.

I do not limit myself to the exact proportions stated, as in some cases I may reverse the proportions and use two parts of zinc and one of tin.

What I claim is—

1. The herein described metallic paint consisting of tin and zinc in a fine granular form, oil and a drier, substantially in the proportions specified.

2. The herein described method of making a pigment consisting in taking tin and zinc, melting the same and mixing them together; cooling the mixture down to a semi-fluid mass, reducing the same to a granulated form and finally mixing the granules with oil and a drier, substantially as described.

In testimony whereof I affix my signature in presence of two witnesses.

PHILIP INCH.

Witnesses:
HENRY E. COOPER,
F. L. MIDDLETON.